United States Patent
Muramatsu

(10) Patent No.: US 9,036,199 B2
(45) Date of Patent: May 19, 2015

(54) IMAGE PROCESSING APPARATUS FOR PERFORMING COLOR MATCHING PROCESSING, IMAGE PROCESSING METHOD, AND COMPUTER-READABLE MEDIUM

(75) Inventor: Mizuki Muramatsu, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 969 days.

(21) Appl. No.: 12/756,766

(22) Filed: Apr. 8, 2010

(65) Prior Publication Data

US 2010/0265524 A1    Oct. 21, 2010

(30) Foreign Application Priority Data

Apr. 15, 2009   (JP) ................. 2009-099065

(51) Int. Cl.
     *H04N 1/60*      (2006.01)
     *G03F 3/08*      (2006.01)
     *H04N 1/32*      (2006.01)

(52) U.S. Cl.
     CPC ........... *H04N 1/603* (2013.01); *H04N 1/32106* (2013.01); *H04N 1/6088* (2013.01); *H04N 2201/0094* (2013.01); *H04N 2201/3204* (2013.01); *H04N 2201/3276* (2013.01)

(58) Field of Classification Search
CPC combination set(s) only.
See application file for complete search history.

(56) References Cited

U.S. PATENT DOCUMENTS 7,230,737 B1 *   6/2007   Ohga .............................. 358/1.9

FOREIGN PATENT DOCUMENTS

| CN | 1701964 A | 11/2005 |
|---|---|---|
| JP | H10-322566 A | 12/1998 |
| JP | 2003-153020 A | 5/2003 |
| JP | 2005-136752 A | 5/2005 |
| JP | 2005-340926 A | 12/2005 |
| JP | 2007-174126 A | 7/2007 |
| JP | 2008-131207 A | 6/2008 |
| JP | 2008131207 A * | 6/2008 |

OTHER PUBLICATIONS

N. Moroney, et al. "The CIECAM02 Color Appearance Model", Proc. IS&T/SID 10th IS&T/SID Color Imaging Conference, 2002.

* cited by examiner

*Primary Examiner* — Barbara Reinier
*Assistant Examiner* — Christopher D Wait
(74) *Attorney, Agent, or Firm* — Canon USA, Inc., IP Division

(57) ABSTRACT

An image processing apparatus includes a storage unit configured to store a plurality of device link profiles corresponding to a combination of color space information of an input device, a viewing condition, and a color conversion method. The image processing apparatus determines whether the stored device link profiles are to be used according to the set color conversion method. If it is determined that the device link profiles are to be used, the image processing apparatus selects one of the plurality of device link profiles according to the color space information of the input device.

14 Claims, 17 Drawing Sheets

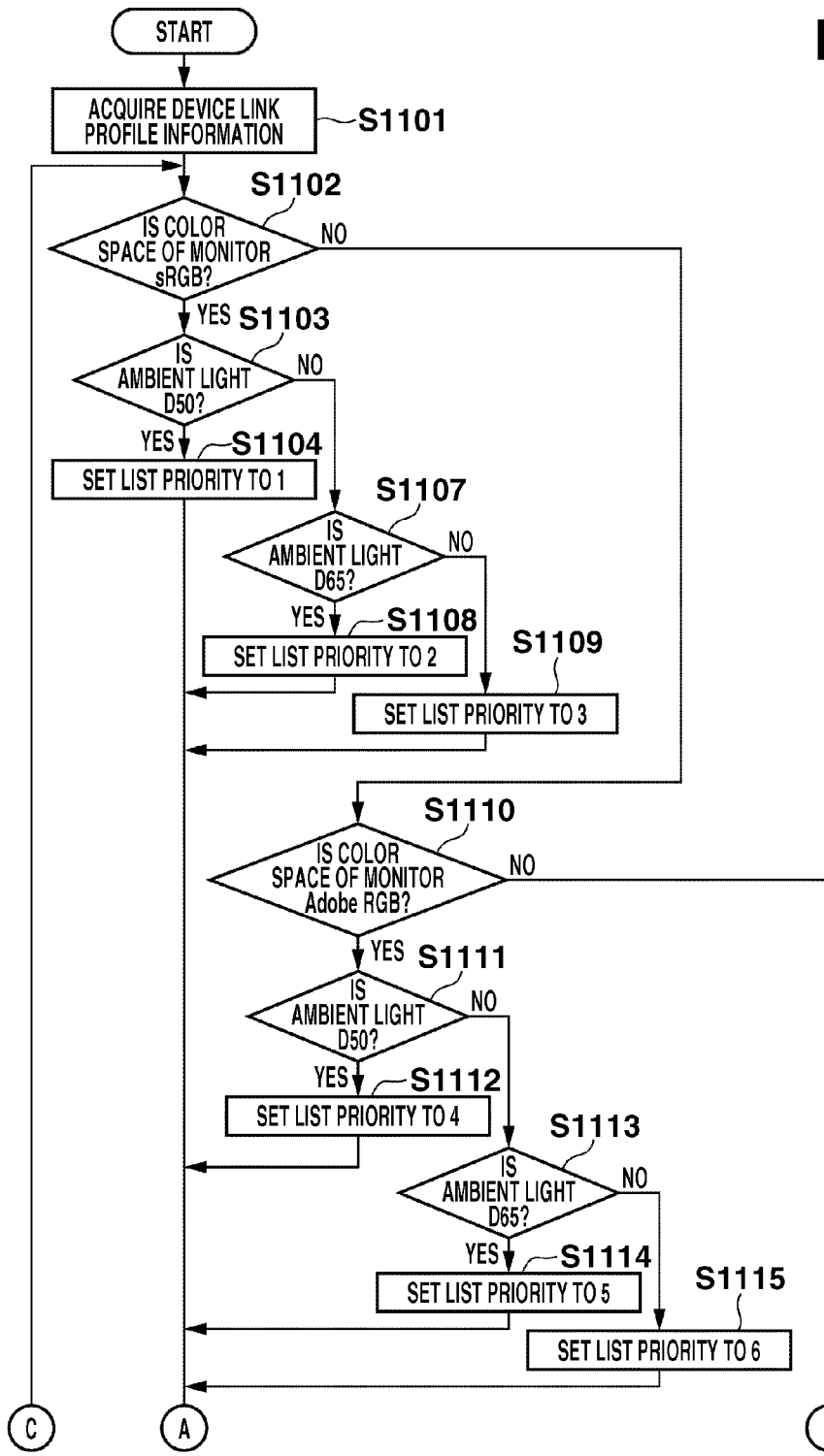

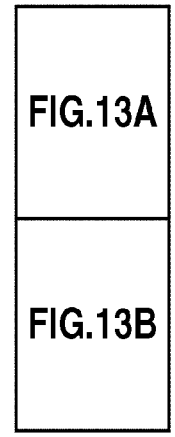
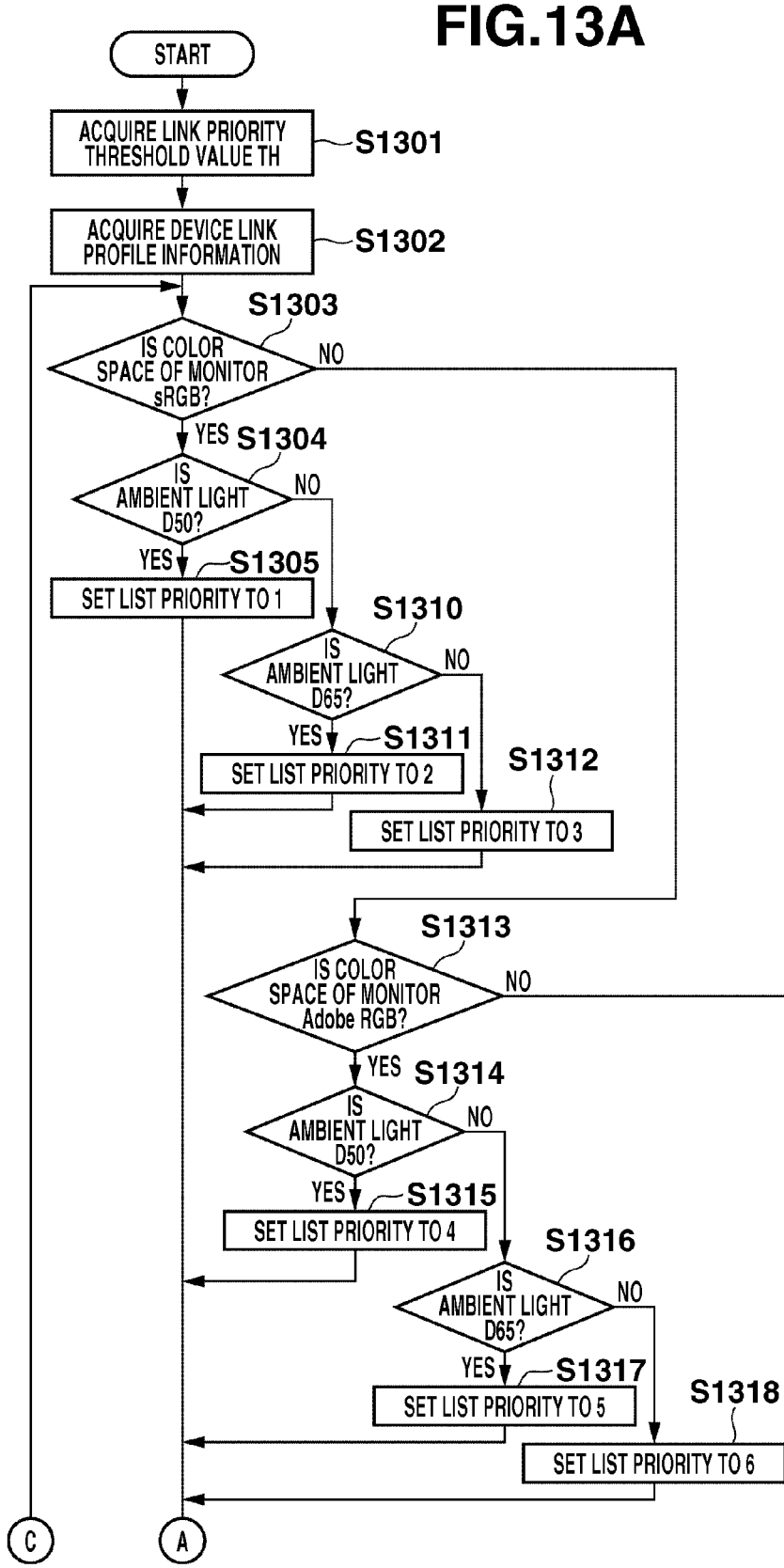
FIG.13A

1401

IMAGE PROCESSING APPARATUS FOR PERFORMING COLOR MATCHING PROCESSING, IMAGE PROCESSING METHOD, AND COMPUTER-READABLE MEDIUM

BACKGROUND OF THE INVENTION

1. Field of the Invention

The present invention relates to an image processing apparatus, an image processing method, and a computer-readable medium storing a program for performing the image processing method, and more particularly to color matching processing of input digital image data.

2. Description of the Related Art

A technique for matching color properties of an input device and color properties of an output device has been used recently, when color data generated on a computer is output by a color printer or a color multifunction peripheral (hereinafter referred to as a "color MFP").

A widely used example of this technique includes color matching processing using an International Color Consortium (ICC) profile.

This method is achieved by interpolation processing using look-up table (LUT) information written in the ICC profile. Accordingly, the process can be performed at high speed, but depending on a color interpolation precision, a difference in color properties between input and output devices may result in different colors as a result of color matching processing.

To meet this issue, a technique for improving the color interpolation precision, i.e., a high-precision color correction technique using Windows® Color System (WCS) has been suggested and carried out.

The WCS generates and uses a color profile in eXtensible Markup Language (XML) for each of modules of a device, a viewing condition, and color gamut mapping. The color profile generated for each module is used by Color Infrastructure & Translation Engine (CITE).

FIG. 15 illustrates an overview of CITE processing 1501 in the WCS. In FIG. 15, a Color Device Model Profile (CDMP) 1502 describes measured values of input and output devices. A measured value of the input device is data representing a correspondence (input color property) between a color value at which the input device images a color patch or a color value at which the input device displays the color patch (L*a*b value) and a colorimetric value of the color patch (L*a*b* value output by a measuring instrument). Further, a measured value of the output device is data representing a correspondence (output color property) between a color value at which the output device prints a color patch and a colorimetric value of the color patch. A Color Appearance Model Profile (CAMP) 1503 is defined based on a visual system of human being. In general, a color appearance model such as CIECAM02 recommended by International Commission on Illumination (CIE) is used. The color appearance model is a model for predicting how a color appears according to viewing conditions having different characteristics in view of chromatic adaptation. The CIECAM02 uses equal-energy white (X=Y=X=100) to perform correction in view of incomplete chromatic adaptation in color prediction processing. Theoretically, equal-energy white is considered to be perceived as being white by human being. When a display image on a monitor and an output image from a printer (printed product) arranged side by side are viewed, the visual system tries to adapt to both of white on the monitor and white in viewed light, i.e., ambient light reflected by the printed product. Accordingly, the color matching precision can be improved by using an adapted white point in view of partial adaptation. The color appearance model is described in N. Moroney, M. D. Fairchild, C. Li, M. R. Luo, R. W. G. Hunt- and, T. Newman, "The CIECAM02 Color Appearance Model", Proc. IS&T/SID10th IS&T/SID Color Imaging Conference (2002). A color gamut map model profile (GMMP) 1504 corresponding to rendering intent of ICC serves as a mapping model for color conversion. The GMMP is implemented with mapping algorithms for respective intents, which are divided into common processing, i.e., baseline, and plug-ins uniquely set by a vendor. For example, if this intent is colorimetric, luminosity clipping processing is determined to be executed.

A device models processing unit 1505 corresponds to mutual conversion processing between device-dependent color of ICC profile and device-independent color, i.e., Profile Connection Space (PCS), and carries out processing upon reading the CDMP 1502. A CAM processing unit 1506 reads the CAMP 1503, and performs mutual conversion processing from a device-independent space to a viewing condition independent space. A Gamut Map Models processing unit 1507 reads the GMMP 1504, and performs color conversion.

As described above, the CITE processing 1501 can use the above CDMP, CAMP, and GMMP to perform color conversion.

The CITE processing 1501 can achieve a high-precision color correction by performing this WCS processing. However, since the CDMP, CAMP, and GMMP are interpreted to dynamically perform color conversion, the processing load is large, and it is difficult to perform the processing at high speed.

Japanese Patent Application Laid-Open No. 2005-136752 discusses that a plurality of color conversion tables corresponding to an ink configuration are prepared in advance, and when the color space of an output side is standard, the previously-prepared color conversion table is used to reduce the above processing load to perform color conversion at high speed.

In the technique discussed in Japanese Patent Application Laid-Open No. 2005-136752, whether the output color space is standard is determined based on the ink configuration, and thereupon, control is performed to choose whether the previously-prepared color conversion is used or a color conversion table is generated according to the ink configuration from the existing ink conversion tables.

However, Japanese Patent Application Laid-Open No. 2005-136752 does not discuss that a color conversion table is generated from each profile when the settings of a viewing condition, an input color space, and color gamut mapping are not standard. Therefore, the technique discussed in Japanese Patent Application Laid-Open No. 2005-136752 cannot achieve both of the data processing improvement and the high-precision color correction.

SUMMARY OF THE INVENTION

According to an aspect of the present invention, an image processing apparatus includes a storage unit configured to store a plurality of device link profiles corresponding to a combination of color space information of an input device, a viewing condition, and a color conversion method, a color conversion method setting unit configured to set the color conversion method, a color matching processing unit configured to perform color matching processing according to the color conversion method set by the color conversion method setting unit, a determination unit configured to determine whether the device link profiles stored in the storage unit are to be used based on a result of the setting set by the color conversion method setting unit, and a selection unit configured to select one of the plurality of device link profiles stored in the storage unit according to the color space information of the input device if it is determined by the determination unit that the device link profiles are to be used.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

In the first exemplary embodiment of the present invention, an image forming apparatus having a color scanner will be described.

Figure 1:
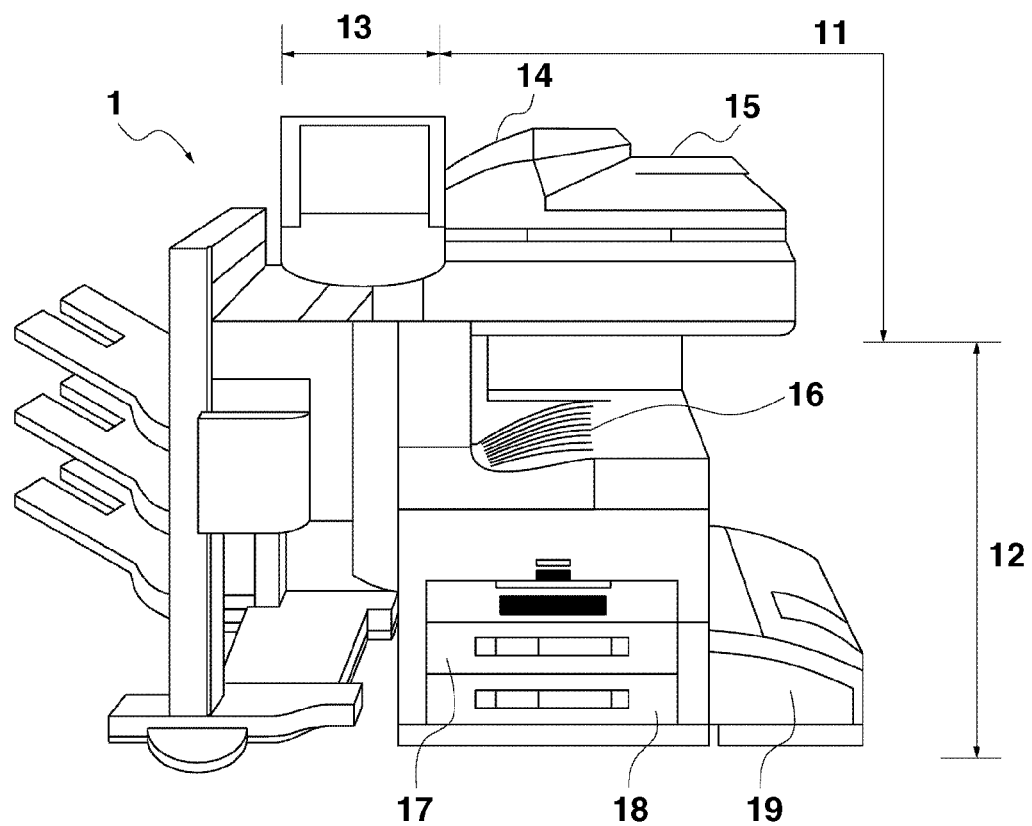
FIG. 1 illustrates an image forming apparatus according to a first exemplary embodiment of the present invention.

An external appearance of an image forming apparatus 1 is illustrated in FIG. 1. The image forming apparatus 1 includes a scanner unit 11 for reading a document image, a printer unit 12 for reproducing image data read by the scanner unit 11, and an operation unit 13 for specifying various types of operational settings of the image forming apparatus 1. The scanner unit 11 converts information on the image into an electric signal by inputting, into a charge coupled-device (CCD), reflected light acquired by exposing and scanning the image on the document. The scanner unit 11 further converts the electric signal into a luminance signal including colors of R, G, B, and outputs the luminance signal as image data to a controller 20, which will be described below with reference to FIG. 2.

The document can be set on a tray 14 of a document feeder 15. When a user manipulates the operation unit 13 to give a reading start instruction, the controller 20 gives the scanner unit 11 a document reading instruction. When the scanner unit 11 receives this instruction, the scanner unit 11 feeds documents one by one from the tray 14 of the document feeder 15, and performs a document reading operation. The document reading method is not limited to this automatic feeding method achieved by the document feeder 15. Alternatively, this may be a method including placing a document on platen glass (not illustrated) and scanning the document by moving an exposure unit.

The printer unit 12 is an image forming device for forming, onto a sheet, the image data received from the controller 20 by using a recording agent. In the present exemplary embodiment, the image forming method is assumed to be an electrophotographic method using a photosensitive drum or a photosensitive belt. However, the present invention is not limited thereto. For example, the present invention can be applied to an inkjet method for printing on a sheet by discharging ink from a minute nozzle array. In addition, the printer unit 12 includes a plurality of sheet cassettes 17, 18, and 19 that allow selection of different sheet sizes or different sheet orientations. A printed sheet is discharged to a discharge tray 16.

Figure 2:
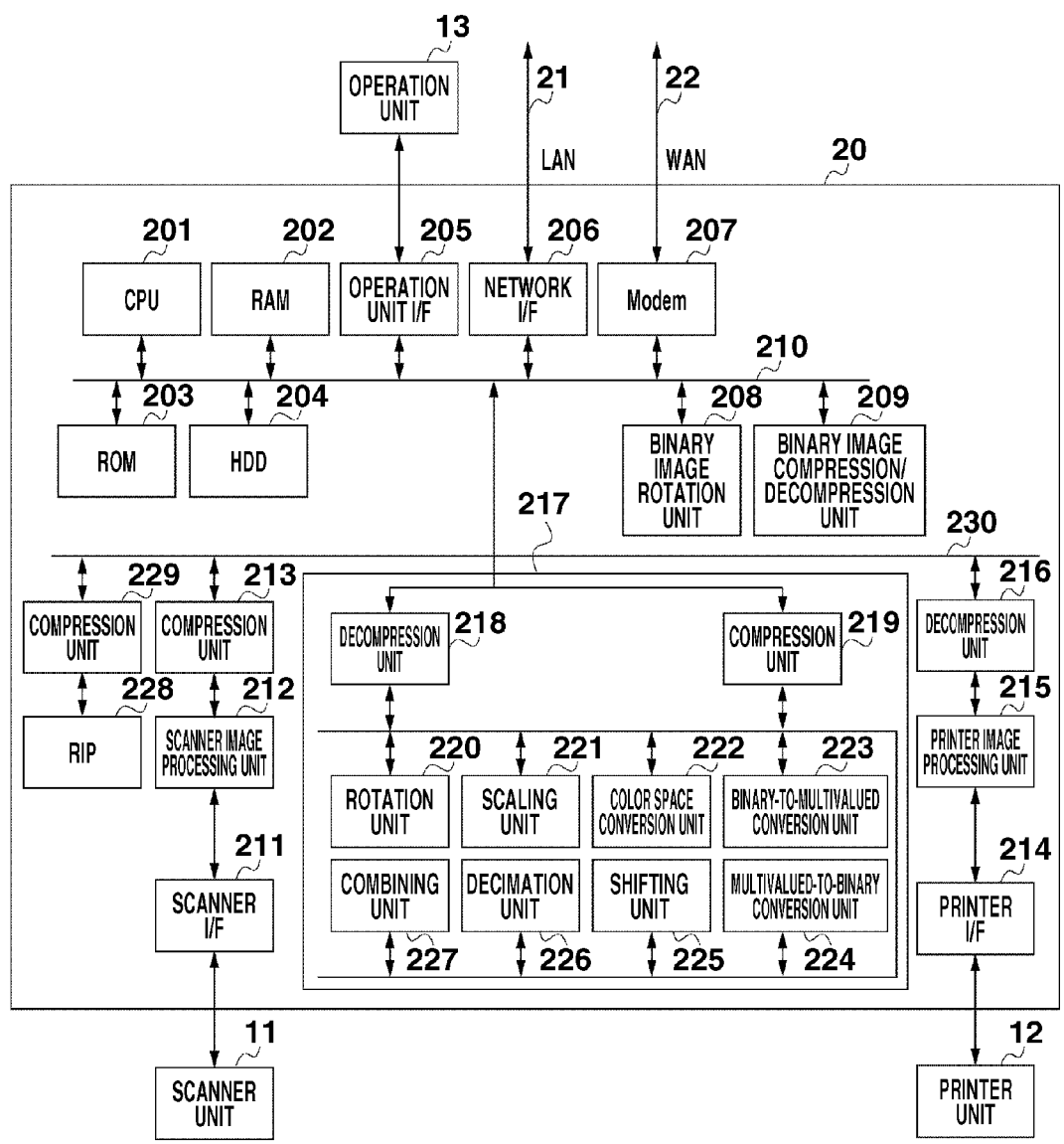
FIG. 2 is a block configuration diagram illustrating a configuration of a controller of the image forming apparatus.

FIG. 2 is a block configuration diagram illustrating a configuration of the controller 20 of the image forming apparatus 1.

The controller 20 is electrically connected to the scanner unit 11 and the printer unit 12. In addition, the controller 20 can also be connected to external apparatuses via a local area network (LAN) 21 and/or a wide area network (WAN) 22. Accordingly, the controller 20 can input and output image data and device information.

A central processing unit (CPU) 201 centrally controls access to various types of connected devices based on a control program stored in a read-only memory (ROM) 203, and also centrally controls various types of processing performed in the controller 20.

A random access memory (RAM) 202 is a system work memory used for operation of the CPU 201, and is also a memory for temporarily storing image data. The RAM 202 includes a static RAM (SRAM) that stores stored contents even after the power is turned off, or includes a dynamic RAM (DRAM) that erases stored contents after the power is turned off.

The ROM 203 stores a boot program of the apparatus. An HDD 204 is a hard disk drive, which can store system software and image data.

An operation unit I/F 205 is an interface unit for connecting a system bus 210 and the operation unit 13. The operation unit I/F 205 receives from the system bus 210 the image data to be displayed on the operation unit 13, and outputs the image data to the operation unit 13. Further, the operation unit I/F 205 receives information from the operation unit 13, and outputs the received information to the system bus 210.

A network interface (I/F) 206 is connected to the LAN 21 and the system bus 210, and inputs and outputs information. A modem 207 is connected to the WAN 22 and the system bus 210, and inputs and outputs information. A binary rotation unit 208 converts the direction of the image data before transmission. A binary image compression/decompression unit 209 converts the resolution of the image data before transmission into a predetermined resolution or a resolution according to the performance of a receiving apparatus. Compression and decompression operations use, for example, methods such as joint bi-level image experts group (JBIG), modified modified read (MMR), modified read (MR), and modified huffman (MH). An image bus 230 is a transmission path for exchanging image data, and includes a PCI bus or IEEE1394.

A scanner image processing unit 212 performs correction, processing, and edition processing on the image data received by a scanner I/F 211 of the scanner unit 11. The scanner image processing unit 212 determines, in units of pixels, e.g., whether the received image data is based on a color document or a black and white document and whether the received data is based on a text document or a photo document. Then, the determination result is attached to the image data. The above attached information is referred to as attribute data. The details of the processing performed by the scanner image processing unit 212 will be described below.

A compression unit 213 receives the image data, and divides the image data into units of blocks. The unit block includes 32 pixels×32 pixels. This unit of 32×32 pixels is referred to as tile data. A region of the document (paper medium before being read) corresponding to this tile data is referred to as a tile image. Average luminance information about the block of 32×32 pixels and a coordinate position of the tile image on the document are attached as header information to the tile data. Further, the compression unit 213 compresses image data including a plurality of tile data. A decompression unit 216 decompresses the image data including the plurality of tile data, then rasterizes the image data, and transmits the rasterized image data as well as the attribute data to a printer image processing unit 215.

The printer image processing unit 215 receives the image data transmitted from the decompression unit 216, and performs image processing on the image data while referencing the attribute data attached to the image data. The processed image data is output to the printer unit 12 via a printer I/F 214. The details of the processing performed by the printer image processing unit 215 will be described below.

An image conversion unit 217 performs predetermined conversion processing on the image data. The image conversion unit 217 includes the following processing units.

A decompression unit 218 decompresses the received image data. A compression unit 219 compresses the received image data. A rotation unit 220 rotates the received image data. A scaling unit 221 performs scaling processing (for example, from 600 dpi to 200 dpi) on the received image data. A color space conversion unit 222 converts the color space of the received image data. The color space conversion unit 222 uses a matrix or a table to perform background color removal processing, LOG conversion processing (RGB to CMY), and output color correction processing (CMY to CMYK). A binary-to-multivalued conversion unit 223 converts received two-level gray image data into 256-level gray image data. On the other hand, a multivalued-to-binary conversion unit 224 converts the received 256-level gray image data into two-level gray image data by using error diffusion processing.

A combining unit 227 combines the received two pieces of image data into one piece of image data. The method for combining two pieces of image data includes a method for adopting an average value of luminance values of pixels to be combined as a combined luminance value and a method for adopting the luminance value of a brighter pixel in terms of the luminance level as the luminance value of the combined pixel. Alternatively, a method for adopting a darker one as a combined pixel may also be used. Still alternatively, a combined luminance value may also be determined based on logical addition calculation, logical multiplication calculation, and exclusive logical addition calculation of pixels to be combined. These combining methods are well-known methods. A decimation unit 226 performs resolution conversion processing by decimating out pixels of the received image data, and generates image data of ½, ¼, and ⅛. A shifting unit 225 adds a margin to the received image data, or removes the margin from the received image data.

A raster image processor (RIP) unit 228 receives intermediate data generated based on page description language (PDL) code data transmitted from a PC, and generates bit map data (multi-value). The details of the processing performed by the RIP unit 228 will be described below.

Figure 3:
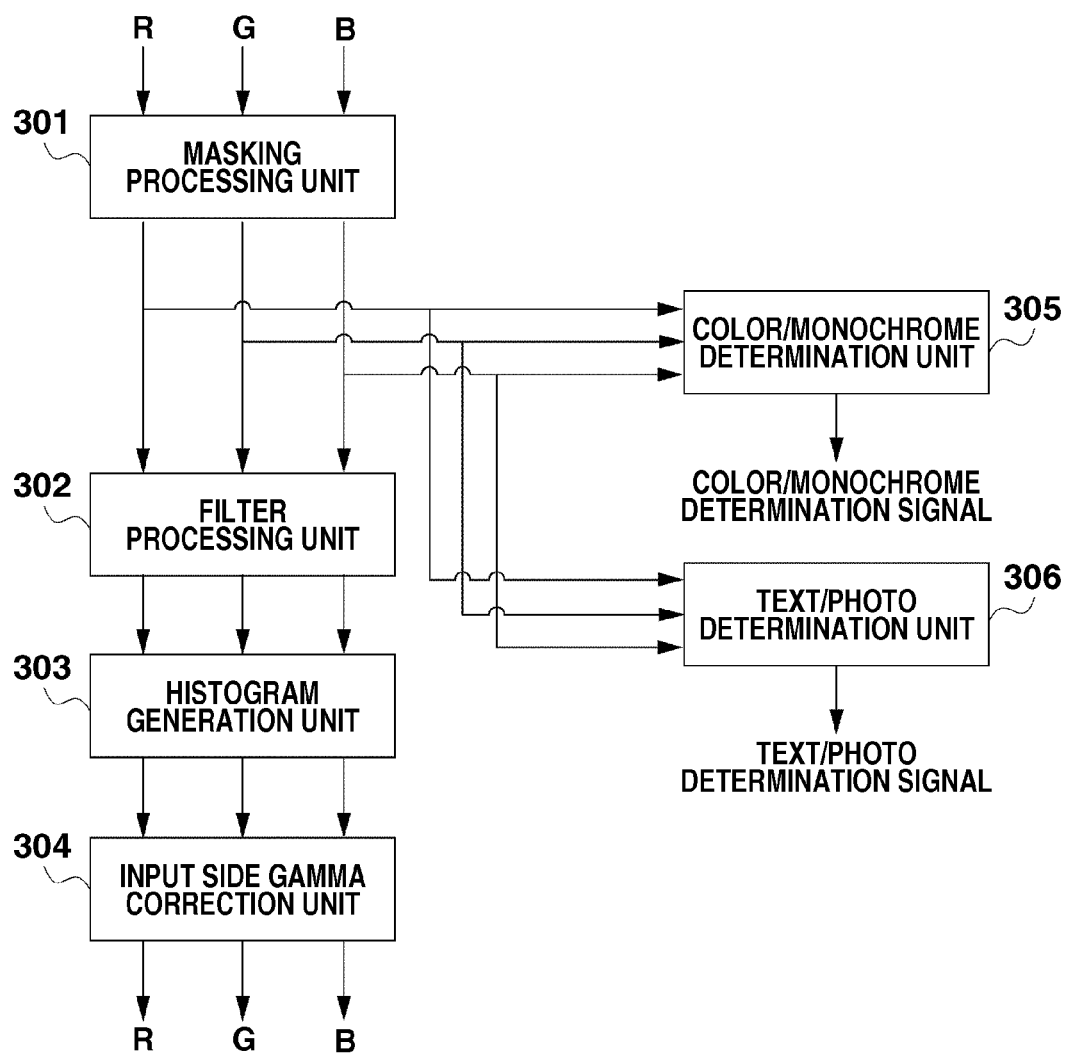
FIG. 3 is a block configuration diagram illustrating an internal configuration of a scanner image processing unit.

FIG. 3 illustrates an internal configuration of the scanner image processing unit 212.

The scanner image processing unit 212 receives image data including a luminance signal of RGB each in 8 bit. This luminance signal is converted by a masking processing unit 301 into a standard luminance signal that does not rely on a filter color of the CCD.

A filter processing unit 302 corrects the spatial frequency of the received image data to any value. The filter processing unit 302 performs calculation processing on the received image data using, for example, a 7×7 matrix. In a copying machine or a multifunction peripheral, the user can select a copying mode from among a text mode, a photo mode, and a text/photo mode by performing a predetermined operation on the operation unit 13. When the operation unit 13 receives the selection of the text mode from the user, the operation unit 13 transmits information representing the selected mode to the CPU 201 via the operation unit I/F 205. The CPU 201 performs control to cause the filter processing unit 302 to apply a text filter to the entire image data. When the photo mode is selected, a photo filter is applied to the entire image data. When the text/photo mode is selected, a filter is adaptively switched for each pixel according to a below-described text/photo determination signal (a part of the attribute data). In other words, whether the photo filter or the text filter is applied is determined for each pixel. The photo filter has a coefficient for smoothing only a high-frequency component. This is to reduce roughness of the image. Further, the text filter has a coefficient for strongly emphasizing the edges. This is to sharply reproduce the text.

A histogram generation unit 303 samples the luminance data of each pixel constituting the received image data. More specifically, luminance data within a rectangular region delaminated by a start position and an end position each of which is specified in the main scanning direction and the sub-scanning direction is sampled at a constant pitch in the main scanning direction and the sub-scanning direction. Then, histogram data is generated based on the sampling result. The generated histogram data is used to predict a background color level when the background color removal processing is performed. An input side gamma correction unit 304 uses a table to convert the image data into luminance data having non-linear properties.

A color/monochrome determination unit 305 determines whether each pixel constituting the received image data is chromatic color or achromatic color, and attaches the determination result as a color/monochrome determination signal (a part of the attribute data) to the image data.

A text/photo determination unit 306 determines, based on a pixel value of each pixel and pixel values of pixels around each pixel, whether each pixel constituting the image data is a pixel constituting a text, a pixel constituting a halftone dot, a pixel constituting a character in halftone dots, or a pixel constituting a solid image. A pixel that is applicable to none of the above pixels is a pixel constituting a white region. Then, the determination result is attached as a text/photo determination signal (a part of the attribute data) to the image data.

Figure 4:
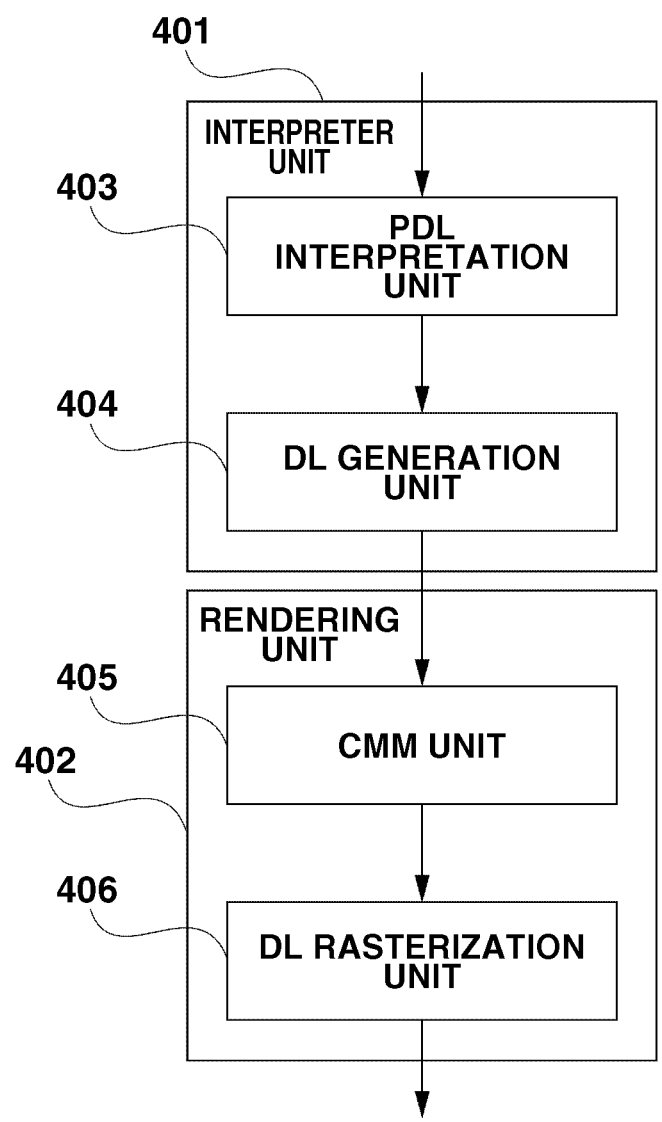
FIG. 4 is a block configuration diagram illustrating an internal configuration of a raster image processor (RIP).

FIG. 4 illustrates an internal configuration of the RIP unit 228.

The RIP carries out processing for simultaneously reproducing, on a page, e.g., vector information such as characters, line drawings, and graphics or image scanning line information such as colors, patterns, and photos described in Page Description Language (PDL).

In other words, the RIP is a processor for expanding each object information into a bit map (raster image) on a memory. In the past, the RIP is mounted as hardware on the output apparatus side, but at the present, the RIP is achieved by software since CPUs have become faster.

In general, the RIP unit 228 is made of two units: an interpreter unit 401 and a rendering unit 402. The interpreter unit 401 includes a PDL interpretation unit 403 for translating PDL and a display list (DL) generation unit 404 for generating an intermediate file called a display list from the interpreted PDL data.

The rendering unit 402 includes a Color Matching Module (CMM) unit 405 for performing a color matching process on the display list and a DL rasterization unit 406 for expanding the display list into bit map (raster image).

The PDL interpretation unit 403 is a unit for analyzing various types of received PDL data. Examples of typical input formats include Adobe's PostScript® language and HP (Hewlett-Packard)'s Printer Control Language (PCL). These are described in printer control codes for generating images in units of pages, and include not only simple text codes but also figure drawing codes and photo/image codes. A document display file format called Portable Document Format (PDF) developed by Adobe is frequently used in various industries and also supports this format directly input to the MFP without using any driver. In addition, the PDL interpretation unit 403 also supports a format for Variable Data Print (VDP), called Personalized Print Markup Language (PPML). Further, the PDL interpretation unit 403 supports color image compression formats such as Joint Photographic Experts Group (JPEG) and Tagged Image File Format (TIFF).

The CMM unit 405 can receive image data of various color spaces such as grayscale, RGB, and CMYK, and performs color matching processing by the ICC profile and the WCS, which are described below. In a copying machine or a multifunction peripheral, the user can select a processing mode of color matching processing by performing a predetermined operation on the operation unit 13. The details of processing modes of color matching processing will be described below.

Figure 5:
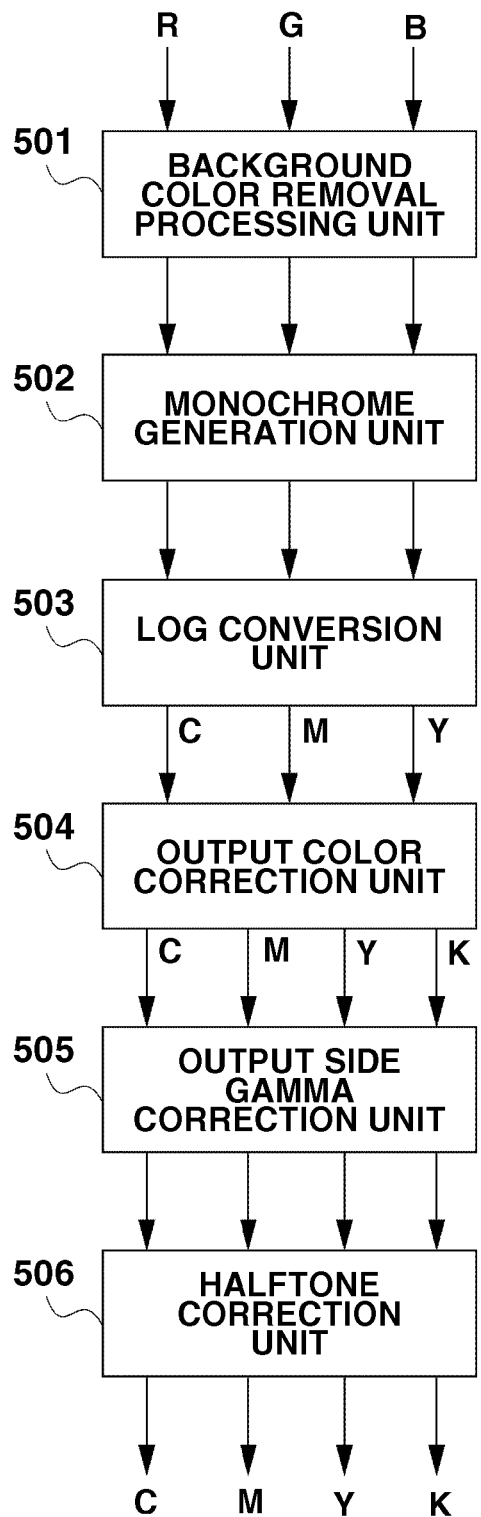
FIG. 5 is a block configuration diagram illustrating an internal configuration of a printer image processing unit.

FIG. 5 illustrates an internal configuration of the printer image processing unit 215.

A background color removal processing unit 501 uses the histogram generated by the scanner image processing unit 212 to a remove background color of the image data.

A monochrome generation unit 502 converts color data into monochrome data. A LOG conversion unit 503 converts luminance into density. For example, the LOG conversion unit 503 converts image data input as RGB into image data of CMY.

An output color correction unit 504 corrects output colors. For example, the output color correction unit 504 uses a table and a matrix to convert image data input as CMY into image data of CMYK.

An output side gamma correction unit 505 performs correction so that a signal value input to the output side gamma correction unit 505 is in proportion to a reflection density value after copy output.

A halftone correction unit 506 performs halftone processing according to the gradation number of an output printer unit. For example, the halftone correction unit 506 converts the received image data having a high gradation level (for example 256 gradation levels) into image data having two levels of gray and 32 levels of gray.

Each of the scanner image processing unit 212 and the printer image processing unit 215 can output the received image data without performing any processing at all. This type of operation for letting data pass through a certain processing unit without subjecting the data to any processing will be hereinafter referred to as "let something pass through a processing unit". For example, when the monochrome mode is not instructed by the operation unit 13, the monochrome generation unit 502 allows data to pass through.

Hereinafter, processing mode setting of the color matching processing, which is a major subject of the present exemplary embodiment, will be described in detail. In the present exemplary embodiment, the input CDMP supports two types, i.e., sRGB and AdobeRGB color spaces, as color space information of the input device, which serve as CDMP, CAMP, and GMMP needed by the WCS processing. This input CDMP is a Color Device Model Profile (CDMP) describing measured values of the input device. The measured values of the input device include data representing a correspondence (input color property) between a color value at which the input device images a color patch or a color value at which the input device displays the color patch (L*a*b value) and a measured value of the color patch (L*a*b* value output by a measuring instrument). The CAMP corresponds to D50 and D65, which are standard viewing conditions. Further, the GMMP supports monitor matching conversion as a color conversion method. As a result, a combination of 2*2 generates four types of color conversion tables with which the WCS processing is carried out. An input of Japan Color is generated as CMYK input, D50 is generated as ambient light, and a device link profile corresponding to colorimetric is generated as a color gamut mapping model. It is assumed that the generated color conversion table is stored in the HDD 204 in advance as a device link profile for the WCS. The device link profile is limited to four types of RGB and one type of CMYK. Accordingly, only those based on the input data color space and environmental conditions that are frequently used by the user are stored in the HDD 204, and the amount of data can be restricted. Further, sRGB and AdobeRGB color spaces are standard color spaces of images taken by digital cameras, and the user is expected to confirm the taken images on a monitor and thereafter to print the images.

Therefore, monitor matching is considered to be most frequently used among the color gamut mapping models, i.e., perceptual, monitor matching, saturation, and colorimetric.

Therefore, in the present exemplary embodiment, a device link profile prepared for sRGB and AdobeRGB color spaces supports the monitor matching.

An example of usage of the CMYK input includes a printing simulation of received CMYK data. Accordingly, only a device link profile supporting colorimetric that faithfully reproduces the colors of Japan Color as a color gamut mapping model is prepared as a device link profile for CMYK input.

In addition, the HDD 204 may store other device link profiles for CMYK input that support colorimetric and input of a printing standard in America, e.g., Specifications for Web Offset Publications (SWOP), and a printing standard in Europe, e.g., Euro scale.

The sRGB used as an input color space of the CDMP is an international standard defined by International Electrotechnical Commission (IEC). Generally-available monitors, printers, and digital cameras are used in conformity to sRGB.

AdobeRGB is a definition of color space suggested by Adobe Systems, and has a much wider (especially wider green) RGB color reproduction region than sRGB. AdobeRGB is suitable for printing and color correction, and is normally used in the field of desktop publishing (DTP).

In the present exemplary embodiment, sRGB and AdobeRGB color spaces are described as the standard color spaces. However, the present exemplary embodiment is not limited thereto. Other color spaces may be applied as the standard color spaces.

Figure 6:
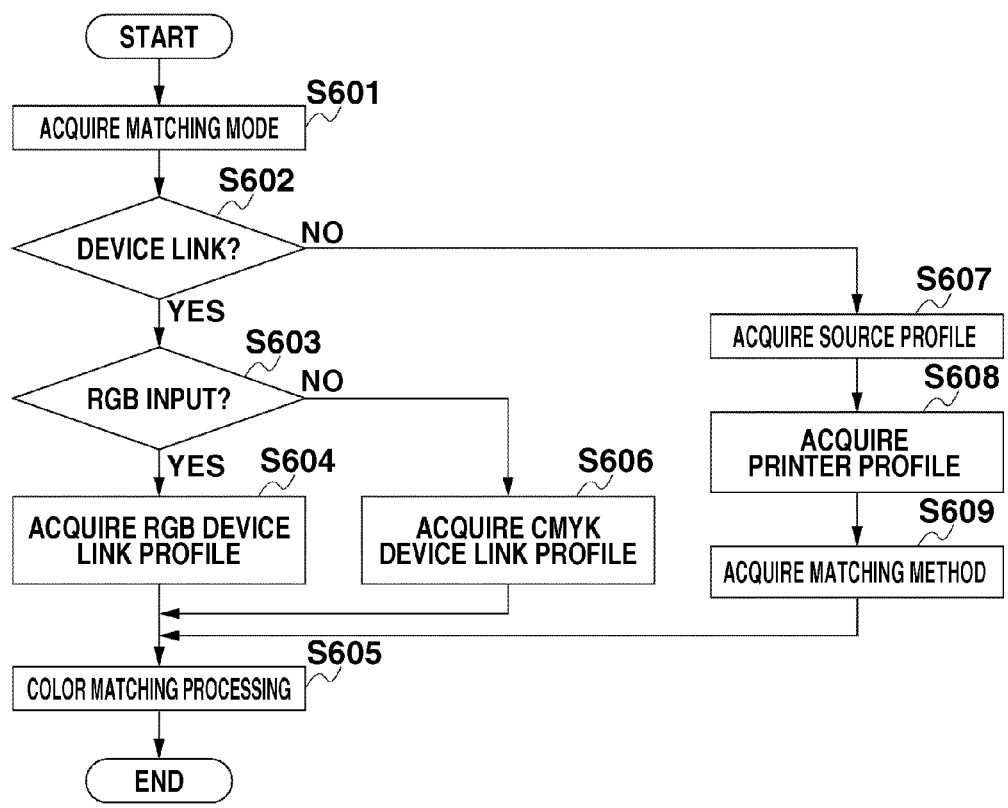
FIG. 6 is a flowchart illustrating an overview of a process for setting a processing mode of color matching processing according to the first exemplary embodiment.

FIG. 6 illustrates an overview of a process for setting a color matching processing mode. A control program achieving the processing in FIG. 6 is stored in the ROM 203 and executed by the CPU 201 as described above.

First in step S601, the CPU 201 acquires a matching mode from the operation unit 13. In step S602, the CPU 201 determines whether the matching mode is a device link mode, i.e., a mode using a device link profile that is a plurality of color conversion tables prepared in advance.

When the CPU 201 determines that the matching mode is the device link mode in step S602, then in step S603, the CPU 201 subsequently determines whether data to be subjected to color matching processing is RGB color space data, i.e., RGB input.

When the CPU 201 determines that the data is RGB input, then in step S604, the CPU 201 selects and acquires an RGB device link profile. In step S605, the CPU 201 performs high-precision color matching processing with the device link profile, and the processing then ends.

On the other hand, when the data is determined not to be RGB input in step S603, then in step S606, the CPU 201 determines that the data to be subjected to color matching processing is data of CMYK color space, i.e., CMYK input, and selects and acquires a CMYK device link profile. Then, the processing proceeds to step S605.

A device link profile is constituted by a look up table (LUT) for RGB-to-CMYK conversion or CMYK-to-CMYK conversion, and color matching processing is performed by means of interpolation calculation.

On the other hand, when the matching mode is determined not to be the device link mode in step S602, color matching processing is performed with the ordinary ICC profile.

Thereupon, the CPU 201 acquires a source profile in step S607, acquires a printer profile in step S608, and acquires a matching method in step S609. Then, the processing proceeds to step S605.

The ICC profile includes a source profile and a printer profile.

With the source profile, the CPU 201 converts RGB (or CMYK) data into a standardized L*a*b* space, and converts this L*a*b* data into a CMYK space suitable for a target printer.

At this point, the source profile includes an RGB profile and a CMYK profile. When the input image is an RGB image (application software of Microsoft Corporation and JPEG and TIFF images), the RGB profile is selected. On the other hand, when the input image is a CMYK image (some data made by Photoshop and Illustrator of Adobe Systems), the CMYK profile is selected.

A printer profile is made according to color properties of each printer. In the case of the RGB image, it is useful to select Perceptual (color tone is given priority) and Saturation (saturation is given priority). On the other hand of the CMYK image, an optimum image is often output upon selecting Colorimetric (color-difference is minimum). The ICC profile is made as a look up table format in general. When RGB (or CMYK) data is input, the RGB (or CMYK) data is uniquely converted into L*a*b* data with the source profile. On the other hand, with the printer profile, L*a*b* data is converted into CMYK data suitable for a printer.

Figure 7:
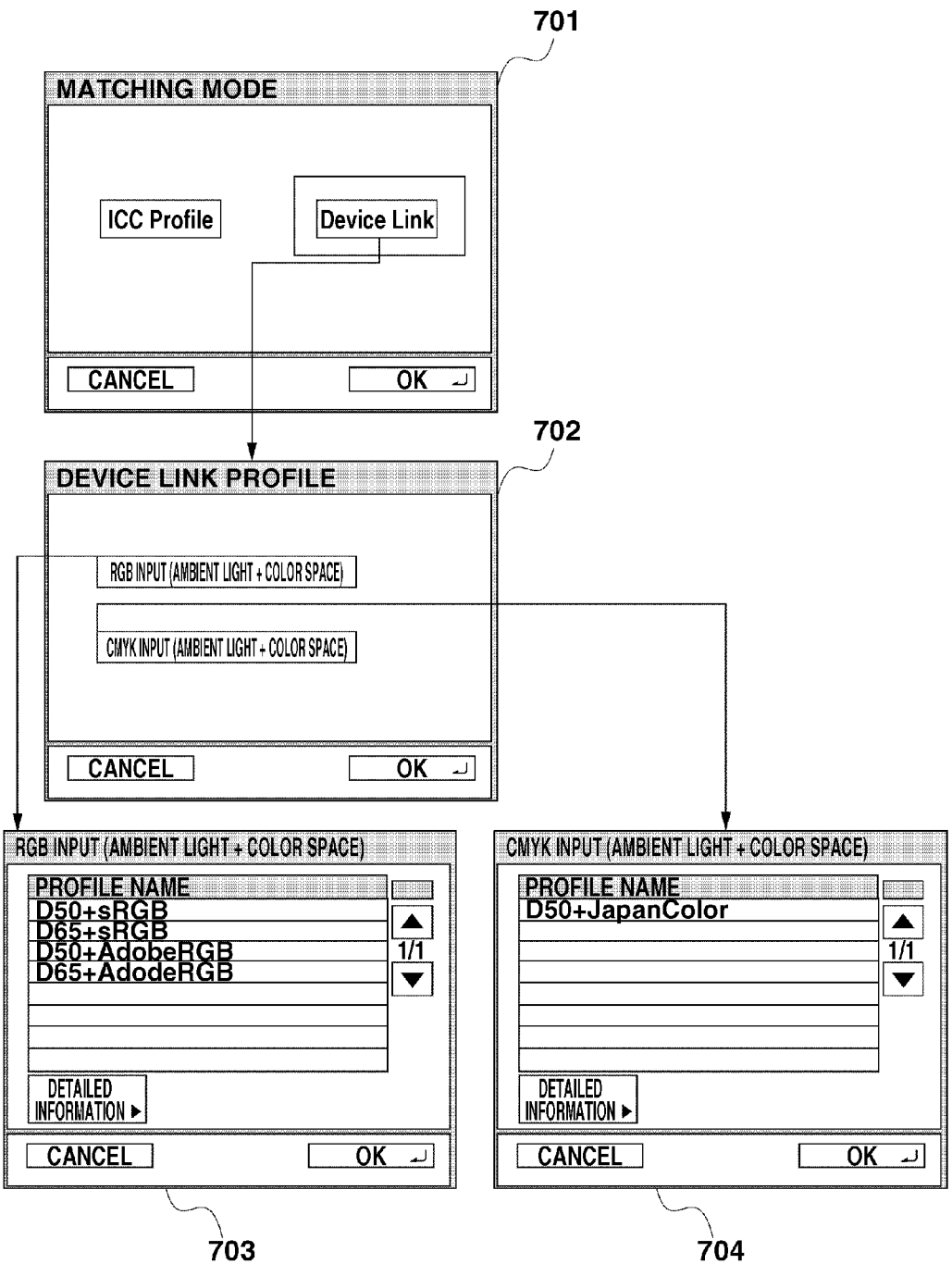
FIG. 7 illustrates an example of an operation performed with an operation unit for setting the processing mode of the color matching processing.

FIG. 7 illustrates an example of operation performed by the user with the operation unit 13 to set the processing mode of the color matching processing.

A matching mode setting screen 701 is a setting screen for the matching mode acquired in step S601 in FIG. 6. A device link setting screen 702 is the one when a device link is set in step S602 in FIG. 6.

A setting screen 703 for an RGB device link profile is the one when an RGB input is set in step S603 in FIG. 6. A setting screen 704 for a CMYK device link profile is the one when an RGB input is not set in step S603 in FIG. 6.

Figure 15:
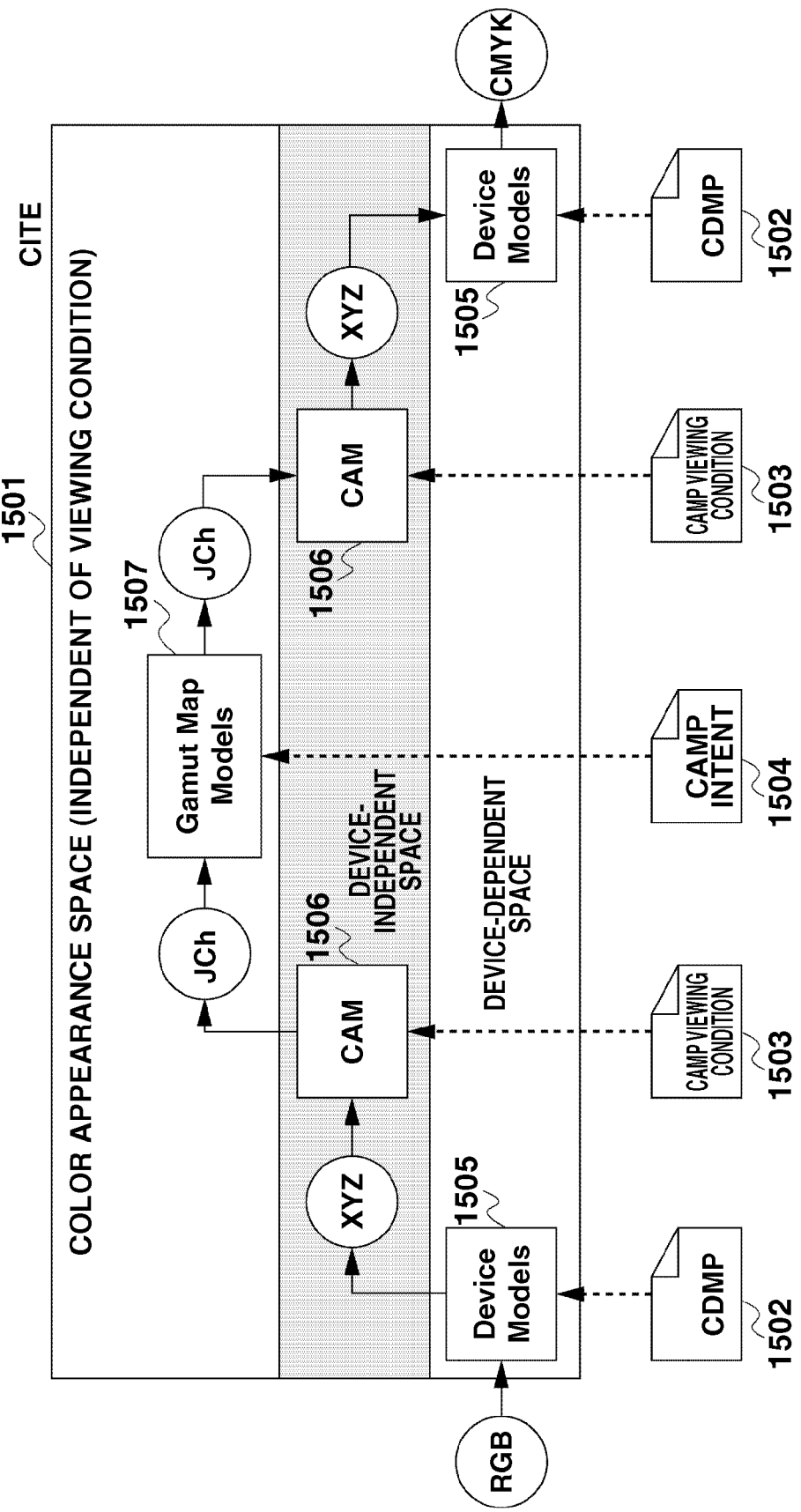
FIG. 15 illustrates an overview of CITE processing performed in the WCS.

With the above processing, a mode for carrying out high-precision color processing is prepared as a device link profile in advance, so that a processing time needed by the high-precision color processing can be improved with respect to the image data to be processed, and the color correction can be achieved with a higher precision. In other words, when a device link profile is not prepared, a color conversion process performed by the WCS in which a color profile is set for each of the modules of a device, a viewing condition (a viewing condition for an input device), and color gamut mapping in an XML description takes huge amounts of time in a sequential conversion processing achieved by the CITE illustrated in FIG. 15. In contrast, the above issue can be solved by preparing the device link profile.

As illustrated in FIG. 7, the HDD stores only the frequently-used color conversion tables supporting color space and ambient light to allow them to be repeatedly used. Therefore, the process can be carried out without hugely increasing the size of the color conversion tables.

In the first exemplary embodiment, the high-precision color processing is carried out by previously preparing, as a device link profile, a mode for carrying out the high-precision color processing. In a second exemplary embodiment of the present invention, every time an input color space, viewing condition, and matching algorithm, which are needed by the WCS processing, are set, high-precision color processing is carried out upon generating a device link profile.

The same processing as the first exemplary embodiment will be denoted by the same reference numerals, and the general description thereof is not repeated. It is assumed that the HDD 204 stores various profiles (CDMP, CAMP, and GMMP) needed by the WCS processing.

Figure 8:
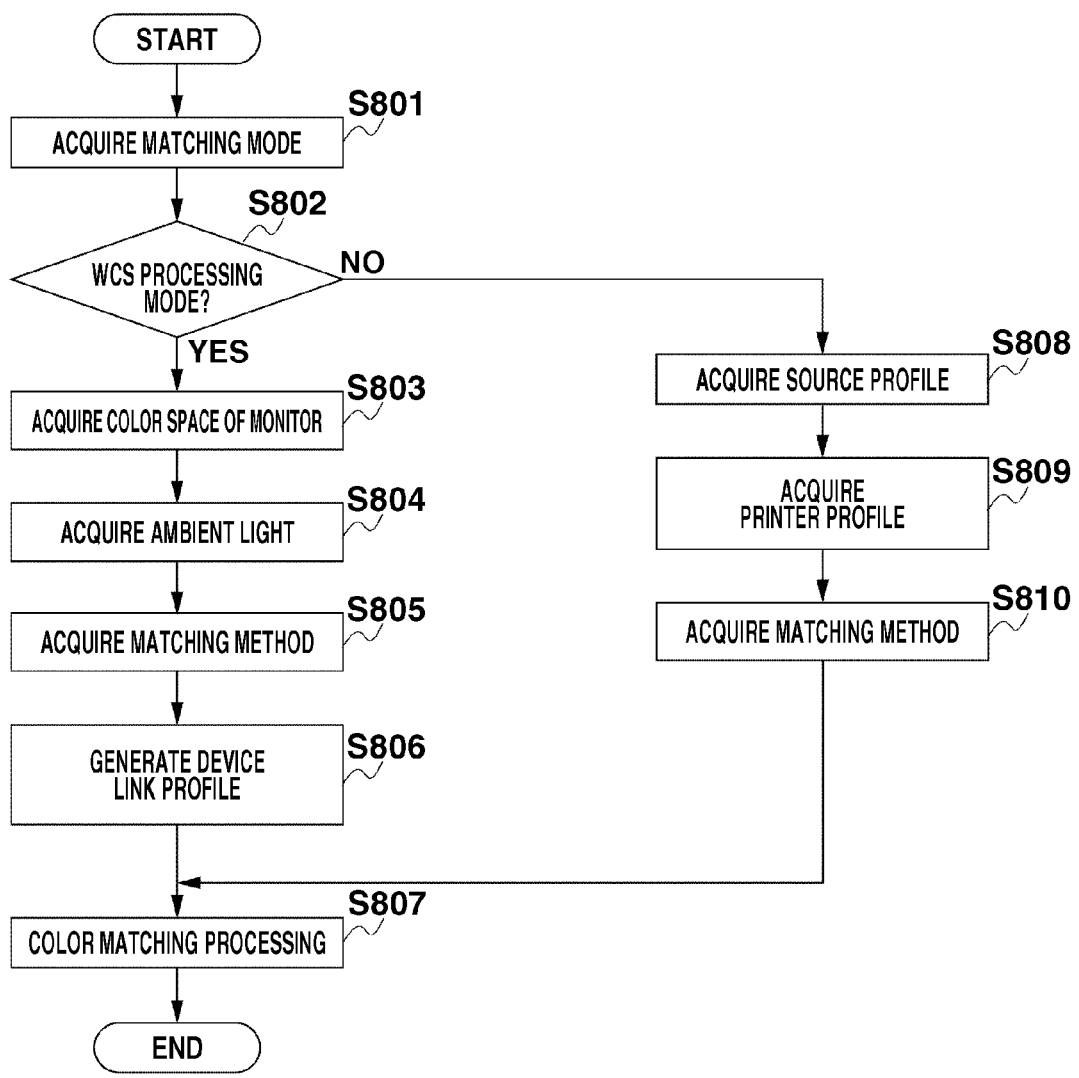
FIG. 8 is a flowchart illustrating an overview of operation for setting a processing mode of color matching processing according to a second exemplary embodiment of the present invention.

FIG. 8 illustrates an overview of operation for setting a color matching processing mode. As described above, a control program achieving the processing illustrated in FIG. 8 is stored in the ROM 203 and is executed by the CPU 201.

First, in step S801, the CPU 201 acquires a matching mode (a set color conversion method) from the operation unit 13, and the CPU 201 determines whether the matching mode is the WCS processing mode in step S802. When the CPU 201 determines that the matching mode is the WCS processing mode in step S802, the CPU 201 acquires color space information of an input device, e.g., a monitor, in step S803, acquires ambient light, i.e., a viewing condition of the input device, in step S804, and acquires information of a color matching processing method in step S805. As a result of the above processing, the color space information is acquired, the viewing condition is acquired, and the color matching processing method is acquired.

Subsequently, the CPU 201 acquires, from the HDD 204, CDMP corresponding to the input (monitor) color space acquired in step S803, CAMP corresponding to the viewing condition acquired in step S804, and GMMP corresponding to the matching method acquired in step S805.

In step S806, the CPU 201 generates a device link profile by performing the WCS processing.

Subsequently, in step S807, the CPU 201 performs the color matching processing using the device link profile generated in step S806, and the processing then ends.

On the other hand, when the CPU 201 determines that the matching mode is not the WCS processing mode in step S802, color matching processing is carried out with the ordinary ICC profile.

Thus, the CPU 201 acquires a source profile in step S808, acquires a printer profile in step S809, acquires a matching method in step S810. then, the processing proceeds to step S807 to perform color matching processing.

Figure 9:
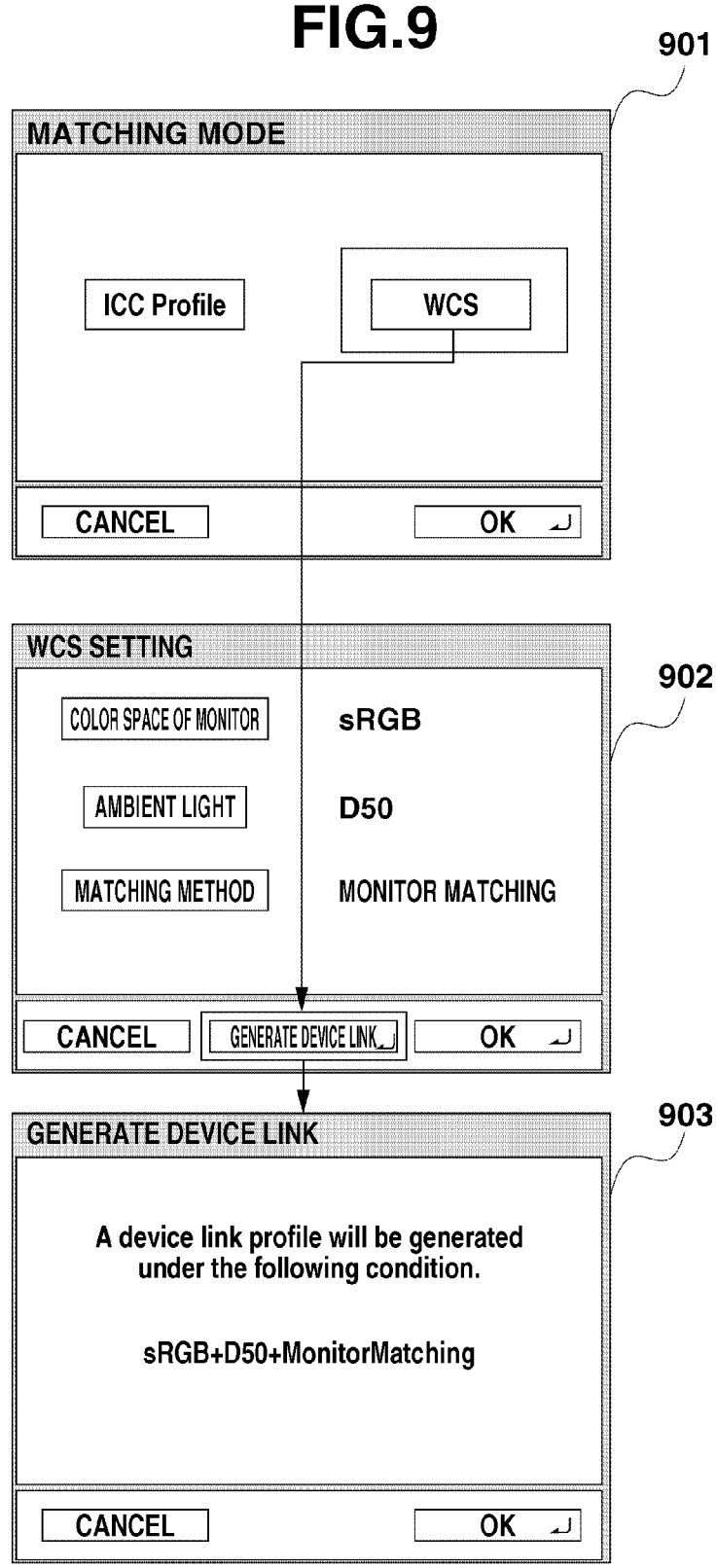
FIG. 9 is an example of an operation performed with an operation unit for setting the processing mode of the color matching processing according to the second exemplary embodiment.

FIG. 9 illustrates an example of operation performed by the user with the operation unit 13 to set the processing mode of the color matching processing. There are a matching mode setting screen 901 for step S801 in FIG. 8 and a WCS setting screen 902 when the WCS processing mode is set in step S802 in FIG. 8.

There is also a setting screen 903 for generating a device link profile in step S806 in FIG. 8.

According to instructions given on this setting screen, the device link profile is generated and stored in the HDD 204.

As a result of the above processing, a device link profile corresponding to each setting is generated in the mode for carrying out the high-precision color processing. Therefore, a higher precision color correction can be achieved, and the processing time required by the high-precision color processing performed under the same setting for the image data used by the user can be improved.

In a third exemplary embodiment of the present invention, when input color space setting, viewing condition setting, matching algorithm setting, and device link processing condition, which are needed by the WCS processing, are in agreement, high-precision color processing is carried out using the previously stored device link profile.

The same processing as the first exemplary embodiment will be denoted by the same reference numerals, and the general description thereof will not be repeated. It is assumed that the HDD 204 stores various profiles (CDMP, CAMP, and GMMP) needed by the WCS processing.

In a device link processing condition in the present exemplary embodiment, the input CDMP is sRGB or AdobeRGB, the CAMP is D50 or D65, which is a standard viewing condition, and the GMMP is the monitor matching conversion.

Figure 10:
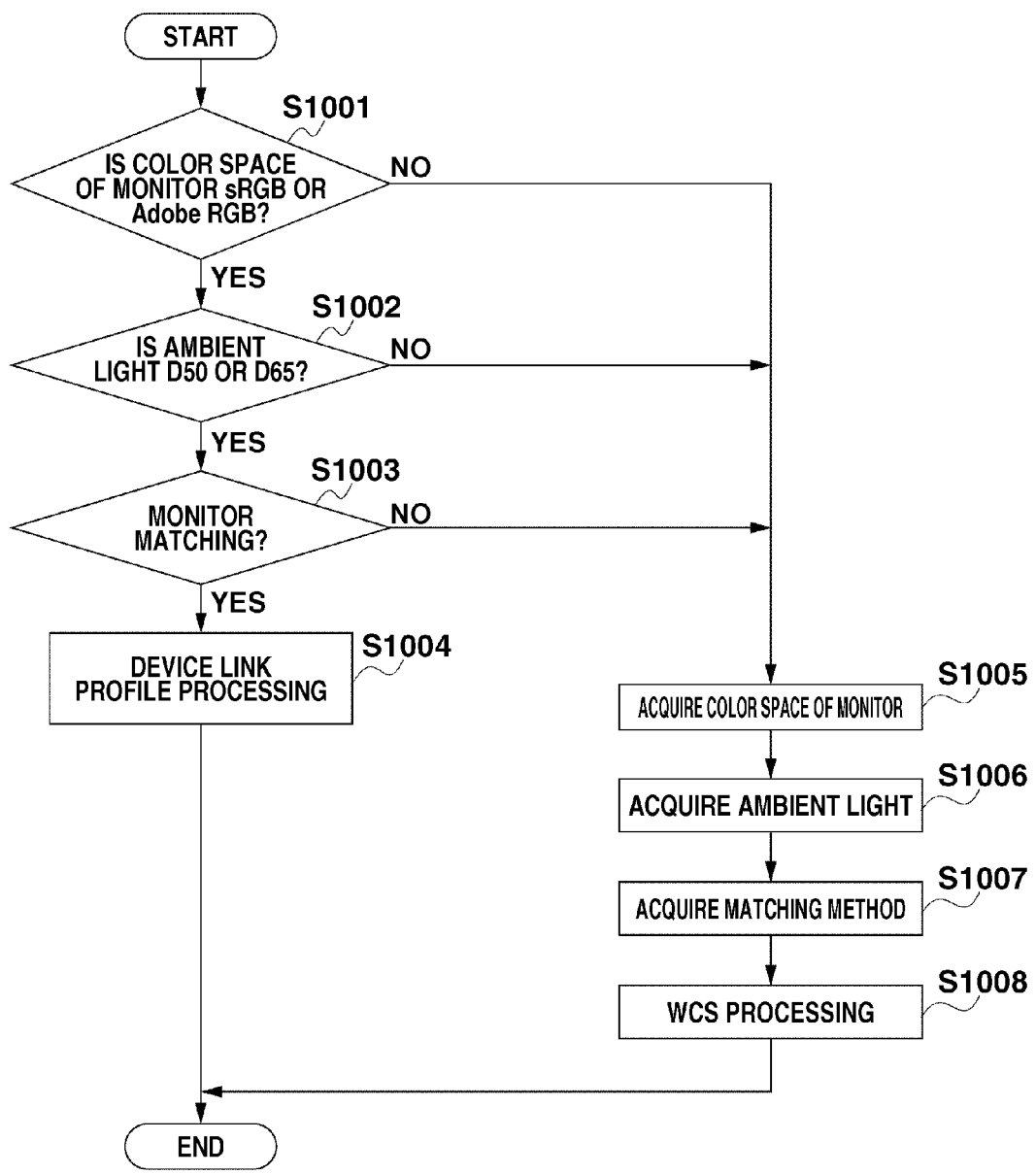
FIG. 10 is a flowchart illustrating an overview of an operation for setting a processing mode of color matching processing according to a third exemplary embodiment of the present invention.

FIG. 10 is a flowchart illustrating an overview of operation for setting a color matching processing mode. As described above, a control program achieving the processing illustrated in FIG. 10 is stored in the ROM 203 and is executed by the CPU 201. The above operation unit 13 allows not only sRGB, AdobeRGB, and Japan Color but also ScRGB and sYCC to be specified. The operation unit 13 allows selection of D93 as an ambient light, and allows selection of Perceptual as a matching method.

First in step S1001, the CPU 201 acquires color space information of the monitor, i.e., an input device, from the operation unit 13, and the CPU 201 determines whether the acquired color space is either sRGB or AdobeRGB. When the color space information of the monitor acquired in step S1001 is determined to be sRGB or AdobeRGB, then in step S1002, the CPU 201 acquires the ambient light information (viewing condition) input from the operation unit 13, and determines whether the acquired ambient light is either D50 or D65. When the ambient light information acquired in step S1002 is determined to be either D50 or D65, then in step S1003, the CPU 201 determines whether the color matching processing method input from the operation unit 13 is monitor matching. When the color matching processing method acquired in step S1003 is determined to be monitor matching, the CPU 201 acquires, from the HDD 204, a device link profile corresponding to the setting acquired in steps S1001, S1002, and S1003. Then in step S1004, the CPU 201 performs high-precision color matching processing using the device link profile, and the processing then ends.

As described above, the stored device link profile is used when the color space information of the monitor is sRGB or AdobeRGB (setting value) determined advance, when the received the ambient light information (viewing condition) is a setting value of D50 or D65, and when the color matching processing method is a setting value of "monitor matching". On the other hand, when all of the above conditions of steps S1001, S1002 and S1003 are not satisfied, i.e., either (1) the color space of the monitor, i.e., an input device, acquired in step S1001 is determined not to be sRGB or AdobeRGB, (2) the ambient light acquired in step S1002 is determined not to be D50 or D65 or (3) the matching method acquired in step S1003 is determined not to be monitor matching, then the CPU 201 acquires the color space of the monitor in step S1005, acquires the ambient light (viewing condition) in step S1006, and acquires the color matching processing method in step S1007.

Subsequently, the CPU 201 acquires, from the HDD 204, CDMP corresponding to the input color space acquired in step S1005, CAMP corresponding to the viewing condition acquired in step S1006, and GMMP corresponding to the matching method acquired in step S1007. Then, the CPU 201 generates a device link profile using the acquired CDMP, CAMP, and GMMP by performing the WCS processing. In step S1008, the CPU 201 performs color matching processing using the generated device link profile, and the processing then ends.

As a result of the above processing, the mode for carrying out the high-precision color processing is prepared in advance as a device link profile. When the conditions are determined to be the same as the settings, the processing can be carried out using the previously prepared device link profile. Even when the settings cannot be processed by the previously prepared device link profile, a device link profile can be generated by the WCS in the same manner as in the second exemplary embodiment, so that the color matching can be achieved. Therefore, without hugely increasing the size of the color conversion tables, a higher precision color correction can be achieved, and the processing time required by the high-precision color processing for the image data used by the user can be improved.

In the second exemplary embodiment, in the mode for carrying out the high-precision color processing, the high-precision color processing is carried out upon generating the device link profile corresponding to each setting. In a fourth exemplary embodiment of the present invention, when a plurality of device link profiles generated in the second exemplary embodiment are displayed on a UI, the plurality of device link profiles are set with priorities.

The same processing as the first exemplary embodiment will be denoted by the same reference numerals, and the general description thereof will not be repeated.

In the present exemplary embodiment, the input color space is given the highest priority, and the viewing condition is given the second priority.

Figure 11B:
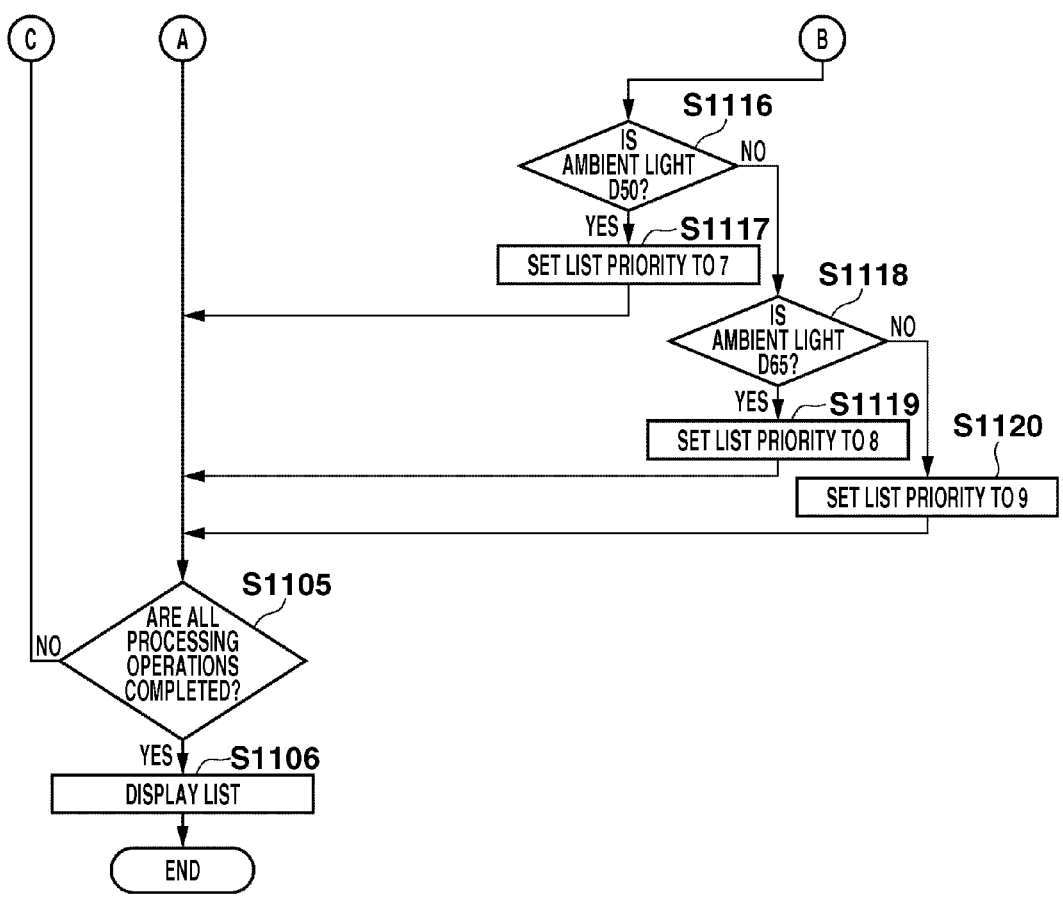
FIG. 11, composed of FIGS. 11A and 11B, is a flowchart illustrating an overview of operation for displaying a plurality of device link profiles as a user interface (UI) according to a fourth exemplary embodiment of the present invention.

FIG. 11, composed of FIGS. 11A and 11B, is a flowchart illustrating an overview of operation for displaying the plurality of device link profiles on the UI. A control program achieving the processing in FIG. 11 is stored in the ROM 203 and executed by the CPU 201 as described above.

First, in step S1101, the CPU 201 acquires device link profile information, and determines whether the color space of the monitor is sRGB in step S1102. When the color space of the monitor is determined to be sRGB in step S1102, the CPU 201 determines whether the ambient light information is D50 in step S1103. When the ambient light information is determined to be D50 in step S1103, the CPU 201 sets a list display priority to 1 in step S1104, and the CPU 201 determines whether the processing for all the device link profiles has been completed in step S1105. When the processing for all the device link profiles is determined to have been completed in step S1105, the CPU 201 displays the list on the UI in step S1106, and the processing then ends.

On the other hand, when the processing for all the device link profiles is determined not to have been completed yet in step S1105, the processing returns to step S1102.

On the other hand, when the ambient light information is determined not to be D50 in step S1103, the CPU 201 determines whether the ambient light information is D65 in step S1107. When the ambient light information is determined to be D65 in step S1107, the CPU 201 sets the list display priority to 2 in step S1108, and the processing proceeds to step S1105.

On the other hand, when the ambient light information is determined not to be D65 in step S1107, the CPU 201 sets the list display priority to 3 in step S1109, and the processing proceeds to step S1105.

On the other hand, when the color space of the monitor is determined not to be sRGB in step S1102, the CPU 201 determines whether the color space of the monitor is AdobeRGB in step S1110. When the color space of the monitor is determined to be AdobeRGB in step S1110, the CPU 201 determines whether the ambient light information is D50 in step S1111. When the ambient light information is determined to be D50 in step S1111, the CPU 201 sets the list display priority to 4 in step S1112, and the processing proceeds to step S1105.

On the other hand, when the ambient light information is determined not to be D50 in step S1111, the CPU 201 determines whether the ambient light information is D65 in step S1113. When the ambient light information is determined to be D65 in step S1113, the CPU 201 sets the list display priority to 5 in step S1114, and the processing proceeds to step S1105.

On the other hand, when the ambient light information is determined not to be D65 in step S1113, the CPU 201 sets the list display priority to 6 in step S1115, and the processing proceeds to step S1105.

On the other hand, when the color space of the monitor is determined not to be AdobeRGB in step S1110, the CPU 201 determines whether the ambient light information is D50 in step S1116. When the ambient light information is determined to be D50 in step S1116, the CPU 201 sets the list display priority to 7 in step S1117, and the processing proceeds to step S1105.

On the other hand, when the ambient light information is not D50 in step S1116, the CPU 201 determines whether the ambient light information is D65 in step S1118. When the ambient light information is determined to be D65 in step S1118, the CPU 201 sets the list display priority to 8 in step S1119, and the processing proceeds to step S1105.

On the other hand, when the ambient light information is determined not to be D65 in step S1118, the CPU 201 sets the list display priority to 9 in step S1120, and the processing proceeds to step S1105.

In other words, in the present embodiment, list priority is set according to the following Table I:

| | Monitor Color Space = sRGB | Monitor Color Space = AdobeRGB | Monitor Color Space Not sRGB or AdobeRGB |
| --- | --- | --- | --- |
| Ambient Light Information = D50 | List Display Priority = 1 | List Display Priority = 4 | List Display Priority = 7 |
| Ambient Light Information = D65 | List Display Priority = 2 | List Display Priority = 5 | List Display Priority = 8 |
| Ambient Light Information Not D50 or D65 | List Display Priority = 3 | List Display Priority = 6 | List Display Priority = 9 |

Figure 12:
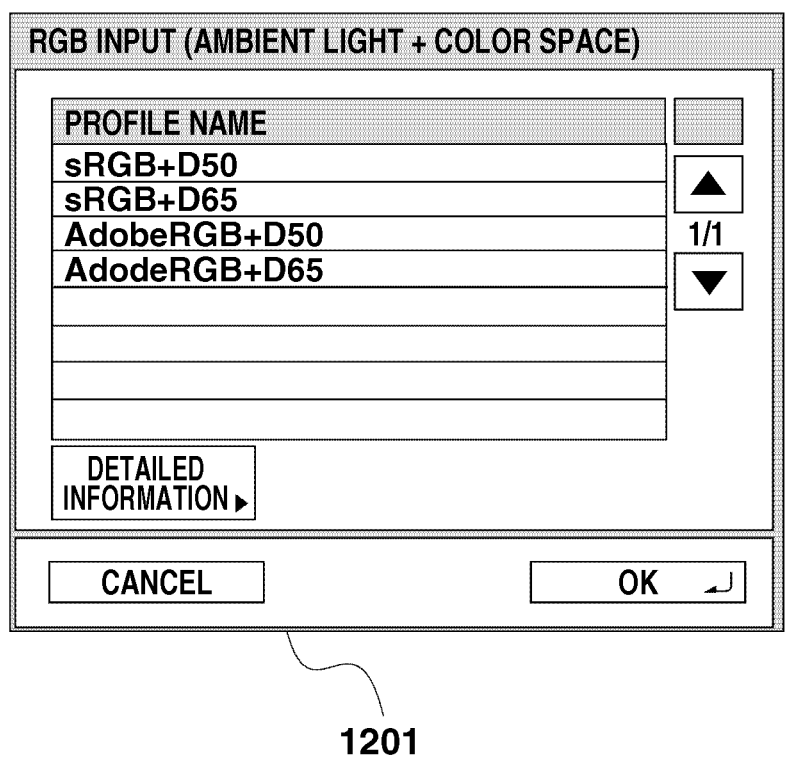
FIG. 12 illustrates an example of a list displayed on an operation unit according to the fourth exemplary embodiment.

FIG. 12 is illustrates an example of a list displayed on the operation unit 13 based on the result of the operation in FIG. 11. The device link profiles are displayed in ascending order of the value of the list display priority of the condition, so that the operator can easily select a device link profile via the operation unit 13.

As a result of the above processing, in the mode for carrying out the high-precision color processing, a plurality of device link profiles are set with priorities when the plurality of device link profiles are displayed on the UI. Therefore, the operability can be improved on the image data used by the user.

In the second exemplary embodiment, the high-precision color processing is carried out by generating the device link profile corresponding to each setting in the mode for carrying out the high-precision color processing. In a fifth exemplary embodiment of the present invention, a plurality of device link profiles generated in the second exemplary embodiment are set with priorities, and those of lower priorities are deleted.

The same processing as in the first exemplary embodiment will be denoted by the same reference numerals, and the general description thereof will not be repeated.

In the present exemplary embodiment, the input color space is given the highest priority, and the viewing condition is given the second priority.

Figure 13B:
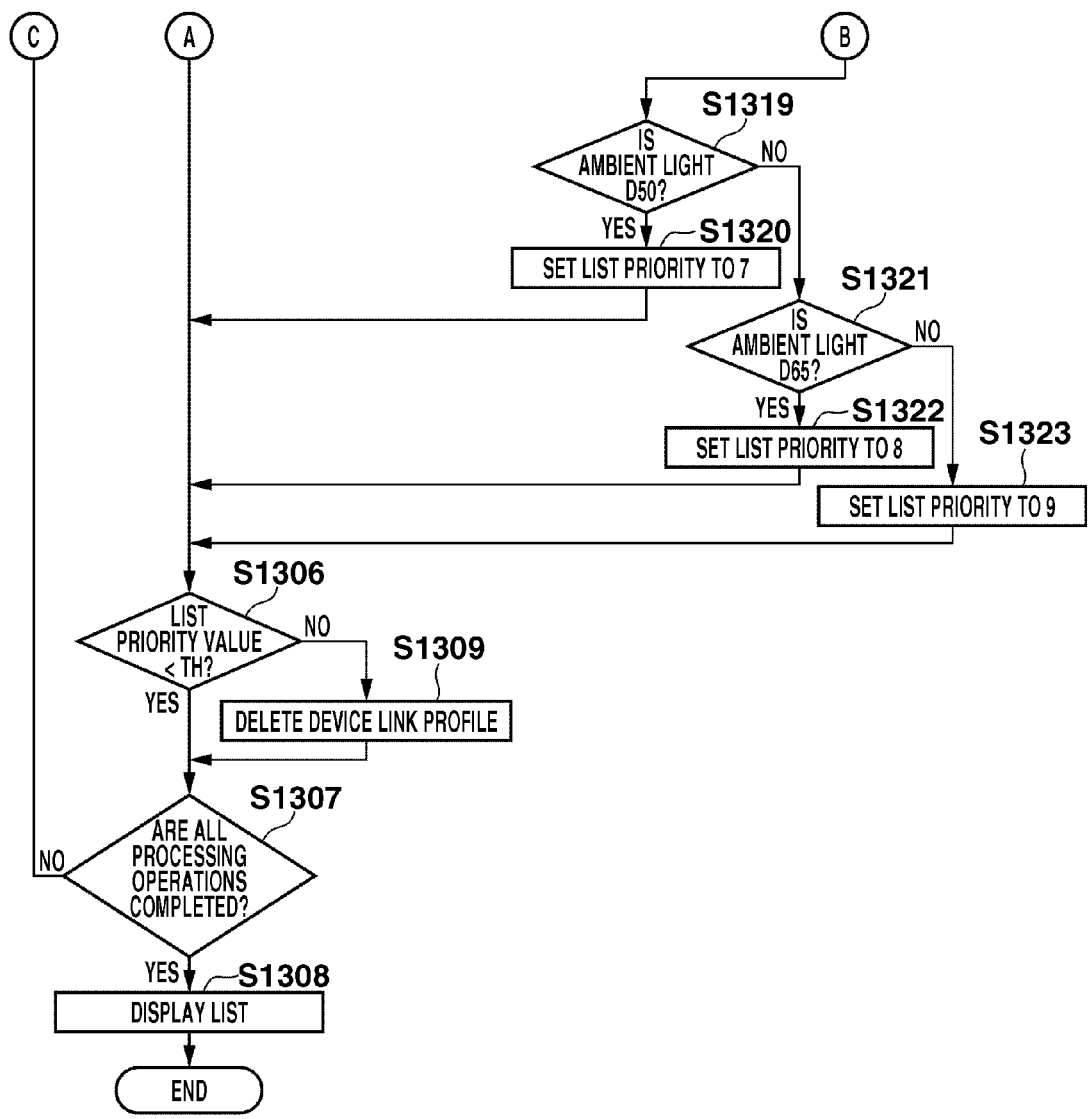
FIG. 13, composed of FIGS. 13A and 13B, is a flowchart illustrating an overview of an operation for displaying a plurality of device link profiles as a UI according to a fifth exemplary embodiment of the present invention.

FIG. 13, composed of FIGS. 13A and 13B, is a flowchart illustrating an overview of operation for displaying the plurality of device link profiles on the UI. A control program achieving the processing in FIG. 13 is stored in the ROM 203 and executed by the CPU 201 as described above.

First, the CPU 201 acquires a list priority threshold value TH in step S1301, and acquires device link profile information in step S1302. When the color space of the monitor is determined to be sRGB in step S1303, the CPU 201 determines whether the ambient light information is D50 in step S1304. When the ambient light information is determined to be D50 in step S1304, the CPU 201 sets the list display priority to 1 in step S1305. In step S1306, the CPU 201 compares the list display priority value with the list priority threshold value TH acquired in step S1301. When the list display priority value is determined to be less than the list priority threshold value TH in step S1306, the CPU 201 determines whether the processing for all the device link profiles has been completed in step S1307. When the processing for all the device link profiles is determined to have been completed in step S1307, the CPU 201 displays the list on the UI in step S1308, and the processing then ends.

On the other hand, when the list display priority value is determined to be greater than the list priority threshold value TH in step S1306, the CPU 201 deletes the applicable device link profile in step S1309, and the processing proceeds to step S1307.

On the other hand, when the processing for all the device link profiles is determined not to have been completed yet in step S1307, the processing returns to step S1303.

On the other hand, when the ambient light information is determined not to be D50 in step S1304, the CPU 201 determines whether the ambient light information is D65 in step S1310. When the ambient light information is determined to be D65 in step S1310, the CPU 201 sets the list display priority to 2 in step S1311, and the processing proceeds to step S1306.

On the other hand, when the ambient light information is determined not to be D65 in step S1310, the CPU 201 sets the list display priority to 3 in step S1312, and the processing proceeds to step S1306.

On the other hand, when the color space of the monitor is determined not to be sRGB in step S1303, the CPU 201 determines whether the color space of the monitor is AdobeRGB in step S1313. When the color space of the monitor is determined to be AdobeRGB in step S1313, the CPU 201 determines whether the ambient light information is D50 in step S1314. When the ambient light information is determined to be D50 in step S1314, the CPU 201 sets the list display priority to 4 in step S1315, and the processing proceeds to step S1306.

On the other hand, when the ambient light information is determined not to be D50 in step S1314, the CPU 201 determines whether the ambient light information is D65 in step S1316. When the ambient light information is determined to be D65 in step S1316, the CPU 201 sets the list display priority to 5 in step S1317, and the processing proceeds to step S1306.

On the other hand, when the ambient light information is determined not to be D65 in step S1316, the CPU 201 sets the list display priority to 6 in step S1318, and the processing proceeds to step S1306.

On the other hand, when the color space of the monitor is determined not to be AdobeRGB in step S1313, the CPU 201 determines whether the ambient light information is D50 in step S1319. When the ambient light information is determined to be D50 in step S1319, the CPU 201 sets the list display priority to 7 in step S1320, and the processing proceeds to step S1306.

On the other hand, when the ambient light information is determined not to be D50 in step S1319, the CPU 201 determines whether the ambient light information is D65 in step S1321. When the ambient light information is determined to be D65 in step S1321, the CPU 201 sets the list display priority to 8 in step S1322, and the processing proceeds to step S1306.

On the other hand, when the ambient light information is determined not to be D65 in step S1321, the CPU 201 sets the list display priority to 9 in step S1323, and the processing proceeds to step S1306.

Figure 14:
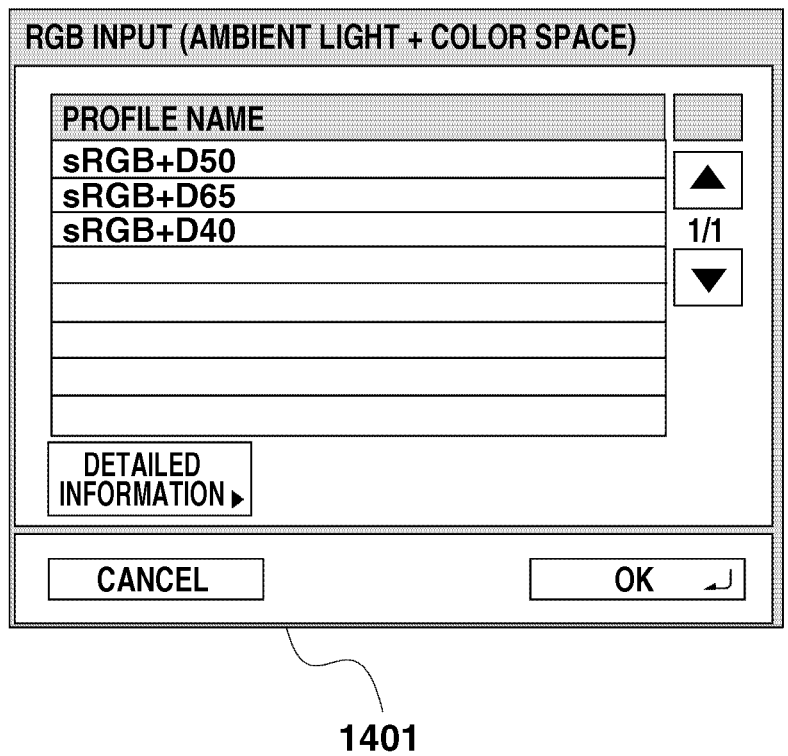
FIG. 14 illustrates an example of a list displayed on an operation unit according to the fifth exemplary embodiment.

FIG. 14 illustrates an example of a list displayed on the operation unit 13 based on the result of the operation in FIG. 13.

FIG. 14 illustrates a display when the list display threshold value TH is set to 4. The list in FIG. 14 displays sRGB+D50 corresponding to the list display priority 1, sRGB+D65 corresponding to the list display priority 2, and sRGB+D40 corresponding to the list display priority 3.

As a result of the above processing, when a plurality of device link profiles are displayed on the UI in the mode for carrying out the high-precision color processing, the plurality of device link profiles are set with priorities, and some of the plurality of device link profiles can be deleted as necessary.

Therefore, the high-precision color processing can be carried out without increasing the number of device link profiles. According to the above exemplary embodiments, the mode for carrying out the high-precision color processing is prepared in advance as a device link profile. Therefore, a processing time needed by the high-precision color processing on image data can be improved, and the color correction can be achieved with a higher precision.

In the above described exemplary embodiment, the processing mode setting of the color matching processing is selected by the operation unit 13. The user interface of a printer driver installed in a host computer (not shown) may alternatively offer a function of the operation unit 13. The host computer may transmit the above described PDL data of RGB or CMYK, related to RGB input and CMYK input respectively, to an image forming apparatus. The image forming apparatus may process the PDL data as shown in the block configuration diagram in FIG. 4.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-099065 filed Apr. 15, 2009, which is hereby incorporated by reference herein in its entirety.

What is claimed is:

1. An image processing apparatus, comprising at least one processor which functions as:

a storage unit configured to store a plurality of device link profiles corresponding to a combination of color space information of an input device, ambient light, and a color conversion method;

a setting unit to set a matching mode for matching a color property of an input device and a color property of an output device based on an instruction given from a user via a screen;

a determination unit configured to determine whether a device link profile stored in the storage unit is to be used, based on the matching mode set by the setting unit;

a first selection unit configured to select color space information of an input device in a case where the determination unit determines use of a device link profile;

a second selection unit configured to select one of the plurality of device link profiles displayed on the screen according to the color space information of the input device selected by the first selection unit, wherein the plurality of device link profiles displayed on the screen are stored by the storage unit; and a color matching processing unit configured to perform color matching processing corresponding to ambient light using the device link profile selected by the second selection unit so as to match the color property of the input device and the color property of the output device under the ambient light.

2. An image processing method comprising:
storing a plurality of device link profiles corresponding to a combination of color space information of an input device, ambient light, and a color conversion method;

determining whether a stored device link profile is to be used according to a set matching mode for matching a color property of an input device and a color property of an output device based on an instruction given from a user via a screen;

selecting color space information of an input device in a case where use of a device link profile is determined;

selecting one of the stored plurality of device link profiles displayed on the screen according to the selected color space information of the input device; and performing color matching processing corresponding to ambient light using the selected device link profile so as to match the color property of the input device and the color property of the output device under the ambient light.

3. A non-transitory computer-readable recording medium on which is recorded a program for executing on a computer the image processing method according to claim 2.

4. The image processing apparatus according to claim 1, wherein the matching mode is either color matching processing using an ICC profile or color matching processing using a device link profile.

5. The image processing apparatus according to claim 1 further comprising a display unit configured to display the plurality of device link profiles stored in the storage unit in a case where the device link profile is determined to be used by the determination unit.

6. The image processing apparatus according to claim 1, wherein the determination unit determines that one of the plurality of device link profiles stored in the storage unit is to be used in a case where the matching mode set by the setting unit is the color matching processing using a device link profile.

7. The image processing apparatus according to claim 1, wherein the determination unit determines that none of the device link profiles stored in the storage unit is to be used in a case where the matching mode set by the setting unit is the color matching processing using an ICC profile.

8. An image processing apparatus comprising:
a storage unit configured to store a plurality of device link profiles corresponding to a combination of color space information of an input device, ambient light, and a color conversion method;

a first selection unit configured to select color space information of an input device;

a second selection unit configured to select one of the plurality of device link profiles displayed on a screen according to the color space information of the input device selected by the first selection unit, wherein the plurality of device link profiles displayed on the screen are stored in the storage unit; and a color matching processing unit configured to perform color matching processing corresponding to ambient light using the one of the plurality of device link profiles selected by the second selection unit so as to match a color property of the input device and a color property of an output device under the ambient light.

9. An image processing apparatus comprising:
a storage unit configured to store a plurality of device link profiles corresponding to a combination of color space information of an input device, ambient light, and a color conversion method;

a determination unit configured to determine whether which an instruction to use a device link profile or an instruction to use an ICC profile has been input;

a first selection unit configured to select color space information of an input device in a case where the determination unit determines that an instruction to use a device link profile has been input;

a second selection unit configured to select one of the plurality of device link profiles displayed on a screen according to the color space information of the input device selected by the first selection unit, wherein the plurality of device link profiles displayed on the screen are stored by the storage unit;

a color matching processing unit configured to, with use of the selected device link profile, perform color matching processing corresponding to ambient light so as to match a color property of the input device and a color property of an output device under the ambient light in a case where the determination unit determines that the instruction to use a device link profile has been input, and to perform color matching processing using an ICC profile in a case where the determination unit determines that the instruction to use an ICC profile has been input.

10. The image processing apparatus according to claim 8, wherein the color space information indicates information for either an sRGB color space or an Adobe RGB color space.

11. The image processing apparatus according to claim 8, wherein the ambient light includes either D50 or D65.

12. The image processing apparatus according to claim 8, wherein the color conversion method is monitor matching conversion.

13. An image processing method comprising:
a storing step of storing a plurality of device link profiles corresponding to a combination of color space information of an input device, ambient light, and a color conversion method;

a first selecting step of selecting color space information of an input device;

a second selecting step of selecting one of the plurality of device link profiles stored in the storing step and displayed on a screen according to the selected color space information of the input device; and a performing step of performing color matching processing corresponding to ambient light using the one of the plurality of device link profiles selected in the second selecting step so as to match a color property of the input device and a color property of an output device under the ambient light.

14. An image processing method comprising:

a storing step of storing a plurality of device link profiles corresponding to a combination of color space information of an input device, ambient light, and a color conversion method;

a determining step of determining whether which an instruction to use a device link profile or an instruction to use an ICC profile has been input;

a first selecting step of selecting color space information of an input device in a case where the instruction to use a device link profile is determined to have been input;

a second selecting step of selecting one of the plurality of device link profiles displayed on a screen according to the selected color space information of the input device, wherein the plurality of device link profiles displayed on the screen are stored; and a color matching processing step of performing, with use of the selected device link profile, color matching processing corresponding to ambient light in a case where the instruction to use a device link profile is determined to have been input in the determining step so as to match a color property of the input device and a color property of an output device under the ambient light, and performing color matching processing using an ICC profile in a case where the instruction to use an ICC profile is determined to have been input in the determining step.

* * * * *